US006230602B1

(12) United States Patent
Baker

(10) Patent No.: US 6,230,602 B1
(45) Date of Patent: May 15, 2001

(54) RESAW FOR CUTTING MULTIPLE BOARDS SIMULTANEOUSLY

(76) Inventor: Edward L. Baker, R.R. 1, Box 34E, Ellsinore, MO (US) 63937

( * ) Notice: Subject to any disclaimer, the term of this patent is extended or adjusted under 35 U.S.C. 154(b) by 0 days.

(21) Appl. No.: 09/008,765

(22) Filed: Jan. 19, 1998

(51) Int. Cl.[7] .............................. B26D 1/52; B26D 1/48; B23D 55/06

(52) U.S. Cl. ................................ 83/804; 83/808; 83/813; 83/819

(58) Field of Search ............................ 83/792, 803, 804, 83/805, 806, 808, 788, 807, 809, 813, 816, 818, 819

(56) References Cited

U.S. PATENT DOCUMENTS

| | | | |
|---|---|---|---|
| 357,681 * | 2/1887 | Maxwell | 83/803 X |
| 1,416,355 * | 5/1922 | Johnson | 83/806 |
| 3,548,697 * | 12/1970 | Gerber et al. | 83/792 X |
| 3,587,379 * | 6/1971 | Meisoll et al. | 83/805 |
| 5,184,533 * | 2/1993 | Golicz | 83/803 X |

FOREIGN PATENT DOCUMENTS

| | | | |
|---|---|---|---|
| 340751 * | 10/1959 | (CH) | 83/808 |
| 96798 * | 4/1898 | (DE) | 83/806 |
| 1415661 * | 9/1965 | (FR) | 83/806 |
| 16574 * | 7/1907 | (NO) | 83/803 |
| WO 85/02357 * | 6/1985 | (WO) | 83/788 |

* cited by examiner

*Primary Examiner*—Clark F. Dexter
(74) *Attorney, Agent, or Firm*—Polster, Lieder, Woodruff & Lucchesi

(57) ABSTRACT

A resaw includes a frame having at least one head. The head includes a horizontal mounting beam with four wheels operatively mounted to the mounting beam. The wheels comprise an inner pair of wheels and an outer pair of wheels. The centers of the inner wheels are vertically offset from the center of the outer wheels. A band blade is mounted about the four wheels to define a first blade portion and a second blade portion which are spaced from each other. A single head can simultaneously make two slices in a cant to cut two or more boards from the cant. The inner and outer wheels can be moved as a unit relative to the path of travel of a cant and the inner wheels can be moved relative to the outer wheels to enable adjustment of the thickness of the boards cut from the cant. In variations, the resaw can have two heads, and each head can have one, two, or more band blades. With a two head resaw, four slices can simultaneously be made in the cant. Where each head of the two head resaw has two band blades, eight slices can simultaneously be cut in the cant.

12 Claims, 5 Drawing Sheets

RESAW FOR CUTTING MULTIPLE BOARDS SIMULTANEOUSLY

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

This invention relates to lumber cutting machinery, and in particular, to a band resaw which is capable of making two or more slices in a cant in a single pass of the cant through the resaw to cut two or more boards simultaneously from the cant The wood and lumber industry has long cut cants into boards for use as flooring, pallet members, fencing, or the like. Depending on the size of the cant being cut, and the thickness of the resulting boards, a cant can be cut into two or more individual boards. Cants previously were cut with gang rip saws. Currently, band resaws are being used more frequently to cut cants into boards. With the currently available band resaws, only a single board is cut from a cant as the cant passes through the resaw. Therefore, to cut the cant into multiple boards, the resaws must be connected together in tandem, or the cant must be returned to the entrance of the resaw after each pass through the resaw. The first option, connecting several resaws together in tandem such that the output of one resaw leads directly to the input of another resaw, can take up a considerable amount of space. This requires a large building to house the resaw. The second option, delivering the cant back to the entrance of the resaw, requires machinery to deliver the cant from the resaw output back to the resaw input, and additional personnel to man the machinery.

Further, when boards are cut from cants one at a time, there is a possibility of miscuts. As boards are cut from cants, tension in the cants is released. This can cause the cant to warp, buck, or curl before the next board is cut from the cant. The resulting warp in the cant can prevent the machinery from cutting boards of equal or constant thickness. If boards of a specific thickness are required for an order, this warping of the cant can result in rejected boards.

BRIEF SUMMARY OF THE INVENTION

A primary object of the present invention is to provide a resaw which will make two or more slices in a cant to cut two or more boards from a cant in a single pass through the resaw.

Another object is to provide such a resaw in which a single head cuts a cant into at least two boards.

A further object is to provide such a resaw in which the thickness of the boards cut by the resaw can be selectively varied.

These and other objects will become apparent to those skilled in the art in light of the following description and accompanying drawings.

Briefly stated, a band resaw is provided which can simultaneously make two or more slices in a cant to cut two or more boards from the cant in a single pass through the resaw. The resaw has frame, an inlet and an outlet defining a path of travel for a cant through the resaw, a head mounted to the frame, and a band blade mounted thereon. The band blade is mounted to the head to define a first blade portion and a second blade portion which are spaced apart from each other. The head is mounted on the frame such that the first and second blade portions are driven generally perpendicularly across the path of travel of the cant. Thus, when the cant is forced through the head, the blades will make two slices in the cant to simultaneously cut at least two boards from the cant. The head includes a first outer wheel, a second outer wheel, a first inner wheel and a second inner wheel. The centers of the inner wheels are offset from the centers of the outer wheels along a plane perpendicular to the path of travel. The band blade is threaded about the wheels such that the first blade portion moves in a first direction and the second blade portion moves in a second opposite direction.

The resaw frame includes a mounting beam extending perpendicularly to the path of travel of the cant. The inner and outer wheels are operably mounted to the mounting beam, and the mounting beam is mounted to the frame to be movable perpendicularly to the path of travel of the cant. At least one adjustment post is provided to move the mounting beam, and hence the head, relative to the conveyor. The adjustment post is mounted to the frame to be movable relative to the frame. Preferably, there are two adjustment posts which are moved in unison to move the mounting beam, and hence to alter the position of the head. The adjustment posts are drivingly received in gear boxes mounted to the frame. The gear boxes in turn are operated by a crank. Where there are two adjustment posts and two gear boxes, the gear boxes are interconnected so that the two posts will be driven in unison. Operation of the crank will move the mounting beam, and hence the head.

The inner wheels can be moved relative to the outer wheels by a second adjustment mechanism to selectively vary the distance between the two portions of the band blade. The second adjustment mechanism includes at least one inner head adjustment bar mounted to the mounting beam to be movable perpendicularly to the mounting beam. An inner wheel bracket is mounted to the end of the inner head adjustment bar, and the inner wheels are operatively mounted to the inner wheel bracket. The inner wheels can be mounted to an inner wheel mounting plate. The inner wheel mounting plate, then, is connected to the inner wheel racket. Preferably, there are two adjustment posts to which the inner wheels are operatively connected. The two inner wheel adjustment posts are driven in unison. Crank driven gear boxes can, for example, be used to drive the inner wheel adjustment posts.

When the inner wheels are moved relative to the outer wheels, the distance between the two outer wheels will need to be changed. Additionally, the ability to change the distance between the outer wheels facilitates mounting and dismounting of the band blade. The second outer wheel, thus, is movable in a path parallel to the first and second blades to be movable toward and away from the first outer wheel. The second outer wheel is mounted to a mounting bracket. The mounting bracket, in turn, is movably mounted to the mounting beam. The bracket includes a plate to which the second outer wheel is mounted and two spaced apart legs which extend over opposite sides of the mounting beam. First and second pistons are mounted on opposite sides of the mounting beam, and the mounting legs, in turn, are connected to the pistons.

The resaw can be provided with a second head to enable the resaw to simultaneously make four or more slices in the cant to cut four or more boards from the cant. To make the four or more slices simultaneously, the first and second heads are substantially in the same plane. The second head is substantially identical to the first head and includes a pair of inner wheels and a pair of outer wheels about which a band blade is mounted. The inner wheels and outer wheels are movable relative to each other in the same manner as are the inner and outer wheels of the first head.

The two head resaw includes a third adjustment mechanism to selectively alter the position of the first and second heads relative to each other. The second head includes a mounting beam to which its wheels are operatively mounted. The resaw includes a pair of legs extending from the first head mounting beam to the second head mounting beam. Adjustment posts extend from the legs to which the second head mounting beam is connected. These adjustment posts are driven in a path parallel to the axis of the legs to move the second head toward or away from the first head. The adjustment posts can, for example, be received by gear boxes which are preferably interconnected. The gear boxes can then be operated to move the second head relative to the first head.

In a further embodiment, one or both of the heads can include a further set of wheels about which further band blades are mounted. Thus, the resaw can have three or four band blades to enable the resaw to simultaneously make six or eight slices through a cant as the cant passes through the resaw. The second set of wheels for the head includes inner and outer pairs of wheels which are movable relative to each other, as are the inner and outer wheels of the head described above. Further, one set of wheels comprises an outer set of wheels and the other set comprises and inner set of wheels. The position of the inner set of wheels relative to the outer set of wheels may be changed by yet another adjustment mechanism.

BRIEF DESCRIPTION OF THE SEVERAL VIEWS OF THE DRAWINGS

Corresponding reference numerals will be used throughout the several figures of the drawings.

DETAILED DESCRIPTION OF THE INVENTION

Figure 1:
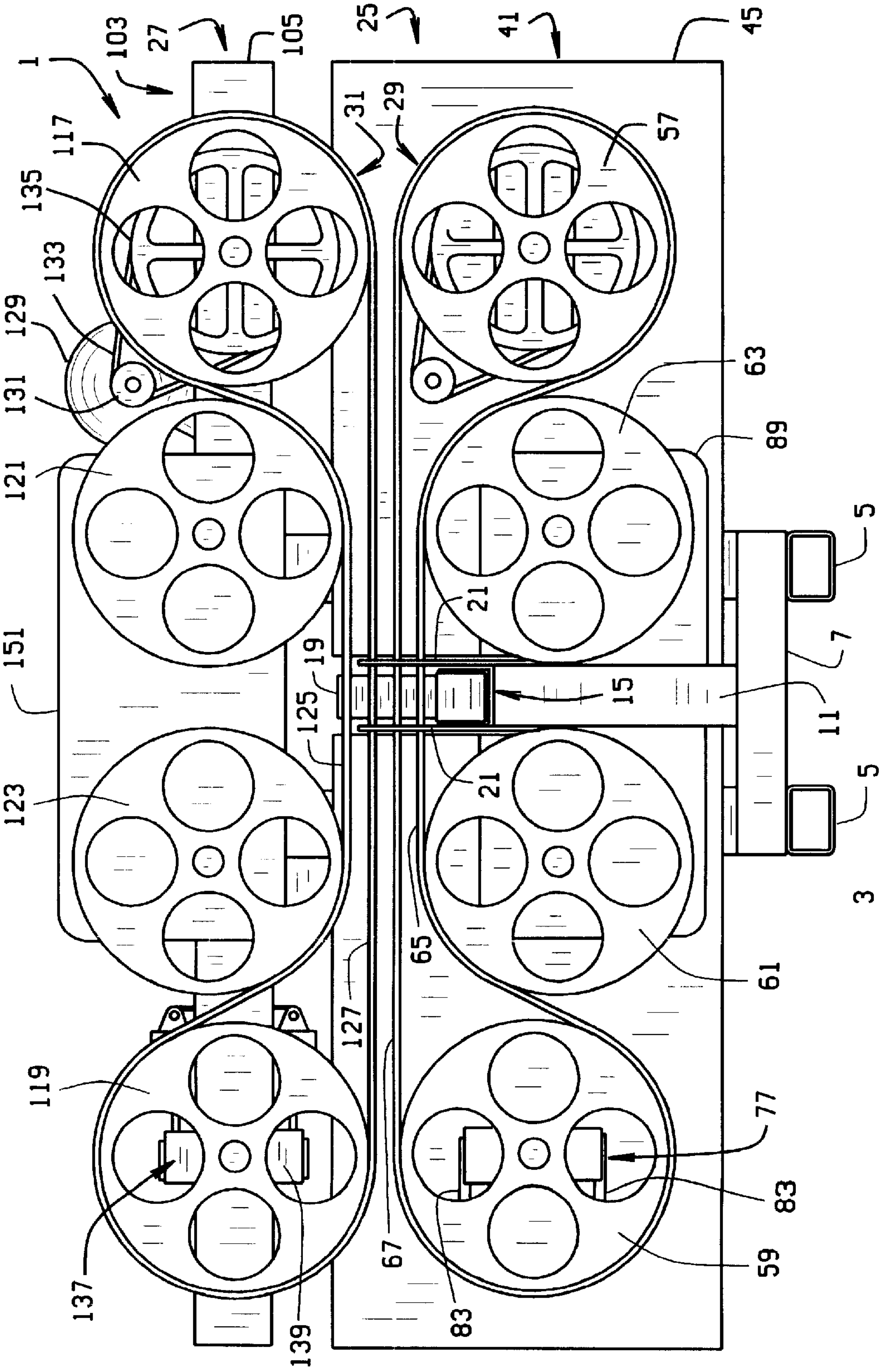
FIG. 1 is a front plan view of a resaw of the present invention adapted to cut a cant into at least four boards, the resaw having a cant thereon.

The following detailed description illustrates the invention by way of example and not by way of limitation. This description will clearly enable one skilled in the art to make and use the invention, and describes several embodiments, adaptations, variations, alternatives and uses of the invention, including what I presently believe is the best mode of carrying out the invention.

A resaw 1 of the present invention is shown generally in FIGS. 1–4. The resaw 1 includes a frame 3 having a pair of spaced apart feet 5. Front and back cross-members 7 and 9, respectively, extend across the tops of the feet 5 to connect them together. Front and back legs 11 and 13 extend up from the cross-members 7 and 9. The feet 5, cross-members 7 and 9, and the legs 11 and 13 are all preferably made from square or rectangular tube stock.

A conveyor assembly 15 is supported by the legs 11 and 13. The conveyor includes a belt 17 upon which a cant 19 can ride Guide rails 21 extend along the conveyor to prevent the cant 19 from falling off the conveyor 15 as the cant 19 is passed through the resaw 1.

The resaw 1 is shown to have two heads 25 and 27 which are vertically spaced apart from each other on a vertical plane. Each head has a band blade 29 and 31 mounted on four wheels. The guide rails 21 include cutouts or slots 33 through which the band blades pass to enable the blades to cut the cant 19. As will be described below, the two heads 25 and 27 can be operated to cut the cant 19 in up to four separate boards in a single pass through the resaw. If desired, only one of the heads could be operated (for example, the lower head 25) to cut the cant 19 in up to two separate boards.

The lower head 25 includes a head frame 41 comprising a horizontal mounting bar 43 to which a face plate 45 is mounted. The plate 45 has a slot 46 through which the conveyor 15 extends. The resaw frame 3 includes a pair of tubular legs 47 which extend upwardly from the back cross-member 9. Preferably, the legs 47 are mounted to the cross-member 9 above the feet 5. A gear box 49 is mounted within each leg 47. A crank 51 is connected to an input of one of the gear boxes 49. The input of the second gear box 49 is connected to the output of the first gearbox 49 by a connecting shaft 53. Thus, operation of the single crank 51 will operate both gear boxes 49. The legs 47 can be positioned such that the shaft 53 passes through the back conveyor supporting leg 13, in front of the leg 13, or even behind the leg 13. Output shafts 55 extend upwardly from the gear boxes 49. The mounting bar 43 is mounted to the top of the output shafts 55. The head 25 is independent of the conveyor 15. Thus, operation of the crank 51 will raise or lower the head 25 relative to the conveyor 15, depending on the direction in which the crank 51 is rotated. As can be appreciated, the movement of the head 25 will change the position of the band blades 29 and 31 relative to the conveyor 15.

The gear box 49 is a conventional gear box, which includes an input (i.e., the crank), and at least one output (i.e., the output shaft 55). As is known, the gear box 49 includes internal gearing which causes the output shaft 55 to raise and lower, and the connecting shaft 53 to rotate, as the crank is rotated.

The head 25 includes two outer wheels 57 and 59 and two inner wheels 61 and 63 which are rotatably mounted to the head frame 41 on the front surface of the plate 45 and around which the band blade 29 is threaded. The inner wheels 61 and 63 are offset vertically from the outer wheels 57 and 59, such that the centers of the inner wheels are below the centers of the outer wheels. As can be seen in FIG. 1, the centers of the inner wheels, when connected define an inner wheel centerline, and the centers of the outer wheels, define an outer wheel centerline. The two lines are parallel to each other. The band blade 29 is threaded such that it extends around the outer wheels 57 and 59 and extends across the top of the inner wheels 61 and 63, so that the blade, when mounted to the wheels, forms an oval which is compressed along a center portion of the oval. This forms a first part 65 and a second part 67 of the band blade 29 which are spaced apart vertically from each other, and which are both above the inner wheels 61 and 63. Due to the manner of threading of the band blade about the wheels 57, 59, 61, and 63, the band blade first part 65 moves across the conveyor 15 in one direction (e.g., left to right) and the band blade second part 67 moves across the conveyor 15 in an opposite direction (e.g., right to left).

The outer wheel 57 is a driven wheel and is driven by a motor 69 which is mounted to the horizontal mounting bar 43 on the back side of the plate 45. Rotation of the driven wheel 57 by the motor will cause the blade 29 to move along its path. The motor 69 has an output shaft, as is known, which extends through the plate 45. A drive pulley 71 is mounted to the end of the motor's output shaft. A second driven pulley 73 is mounted to the same axle to which the wheel 57 is mounted. The two pulleys 71 and 73 (FIG. 4) are connected by a belt 75. If desired, the wheel 57 could be chain driven, rather then belt driven. Alternatively, the wheel 57 could be directly driven by the motor 69.

Figure 4:
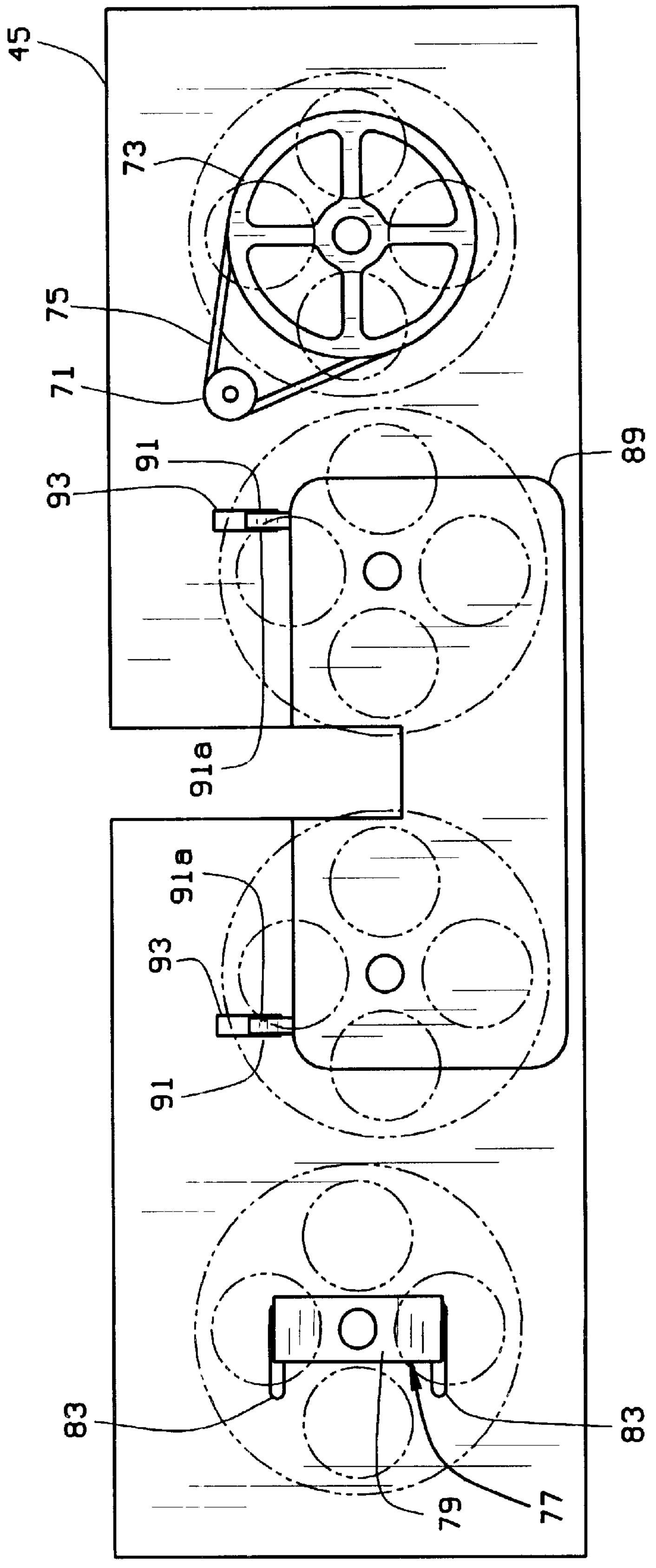
FIG. 4 is a plan view of a front plate of the resaw, to show the mounting of wheels to the plate of a lower head of the resaw, and the adjustability of the wheels.

To facilitate mounting and dismounting of the band blade 29, the wheel 59 is mounted to the head frame 41 so that it may move toward and away from the wheel 57 (i.e., in a path parallel to the band blade portions 65 and 67). The wheel 59 is rotatably mounted on a bracket 77 (FIG. 4). The bracket 77 includes a front face 79 to which the wheel 59 is mounted and a pair of legs 81 (FIG. 3) which extend rearwardly through a pair of elongate horizontal slots 83 in the plate 45. The slots 83 and the bracket legs 81 are positioned to be on opposite sides of the mounting bar 43. Cylinders 87 (either hydraulic or pneumatic) are mounted on opposite sides of the mounting bar 43. The cylinders 87 each include a cylinder rod 89 to which the bracket legs 81 are mounted. The cylinders 87 are mounted between the bracket 77 and the conveyor 15 such that activation of the cylinders 87 will urge the wheel 59 away from the wheel 57. The cylinders 87 are connected to a pneumatic or hydraulic source (not shown) to operate the cylinders, as is known. By deactivating the cylinders, the force exerted by the cylinders on the wheel is released, and the wheel 59 can be moved towards the wheel 57 to facilitate mounting and dismounting of the band blade 29. When the band blade 29 is mounted to the head 25, the cylinders 87 can be activated to maintain the band blade at a desired tension.

The inner wheels 61 and 63 are mounted to the head frame 41 so that they may be moved vertically relative to the outer wheels 57 and 59. Movement of the inner wheels relative to the outer wheels alters the gap between the band blade portions 65 and 67 to alter the thickness of the boards that are cut from the cant 19. As can be appreciated, when the gap between the band blade portions is widened, the distance between the outer wheels will have to be shortened to maintain the desired tension on the band blade. Similarly, when the gap is narrowed, the distance between the outer wheels will have to be widened. The cylinders 87 will operate, as discussed above, to automatically maintain the desired tension on the band blade. Thus, the band blade does not have to be dismounted from the head 25 to alter the position of the inner wheels 61 and 63 relative to the outer wheels 57 and 59. However, the cylinders may be deactivated to make adjustment of the inner wheel position easier.

The inner wheels are mounted to a plate 89 which is mounted to the head frame 41 to be movable relative to the outer wheels 57 and 59 in a direction perpendicular to the band blade portions 65 and 67. The inner wheel plate 89 is mounted to a pair of brackets 91 which extend through generally vertical slots 93 in the plate 45. The brackets 91 are generally U-shaped, and have a front leg 91*a* to which the plate 89 is mounted, a cross-member which extends through the slot 93, and a rear leg 91*c* which extends along the back side of the plate. The rear bracket legs 91*c* are each mounted to the output shafts 95 of gear boxes 97. The gear boxes 97 are mounted to the mounting bar 43. The gear boxes 97 are interconnected by a connecting shaft 99 and are operated by a crank 101 which is connected to the input of one of the gear boxes 97. Thus, when the crank 101 is rotated, the output rods 95 will be raised (or lowered) in unison. Although the inner wheels 57 and 59 are shown mounted to the plate 89, they could be directly mounted to individual brackets. Because the gear boxes 97 are interconnected, the inner wheels 57 and 59 are moved in unison and to the same amount. This keeps the lower portion 65 of the band blade 29 level.

The upper head 27 is substantially similar to the lower head 25. It has a head frame 103 comprising a mounting bar 105. A pair of legs 107 extend up from the mounting bar 43 of the lower head 25. Preferably, the legs 107 are colinear or aligned with the legs 47. The legs 107 are preferably made from tubing, and have gear boxes 109 mounted in them near their tops. The gear boxes 109 are interconnected by a connecting shaft 111 and operated by a crank 113. Each gear box 109 has an output shaft 115. The mounting bar 105 is then mounted to the tops of the output shafts 115. The operation of the crank 113 will raise and lower the two output shafts 115 in unison to raise or lower the mounting bar 105.

Four wheels are rotatably mounted to the upper head frame 103. The four wheels include two outer wheels 117 and 119 and two inner wheels 121 and 123. As with the wheels from the lower head 25, the centers of the inner wheels are vertically offset from the centers of the outer wheels. This time, the centers of the inner wheels are above the centers of the outer wheels. The band blade 31 is threaded about the wheels 117–123 such that the band blade extends around the outer wheels 117 and 119 and then extends across the bottoms of the inner wheels 121 and 123, as best seen in FIG. 1. This defines two vertically spaced apart portions 125 and 127 of the band blade 31, both of which are below the inner wheels 121 and 123 and which run in opposite directions when the head 27 is operated.

The wheel 117 is a driven wheel and is driven by a motor 129 which is mounted to the upper head mounting bar 105. As with the lower head 25, the motor directly drives a pulley 131 which, via a belt 133, drives a second pulley 135. The second pulley 135 and the wheel 117 are operatively connected so that the pulley 135 will rotate the wheel 117 about an axle to drive the band blade 31. As can be appreciated, rotation of the wheel 117 by the motor 129 will cause the band blade 31 to move about its path which is defined by the wheels 117–123.

Figure 2:
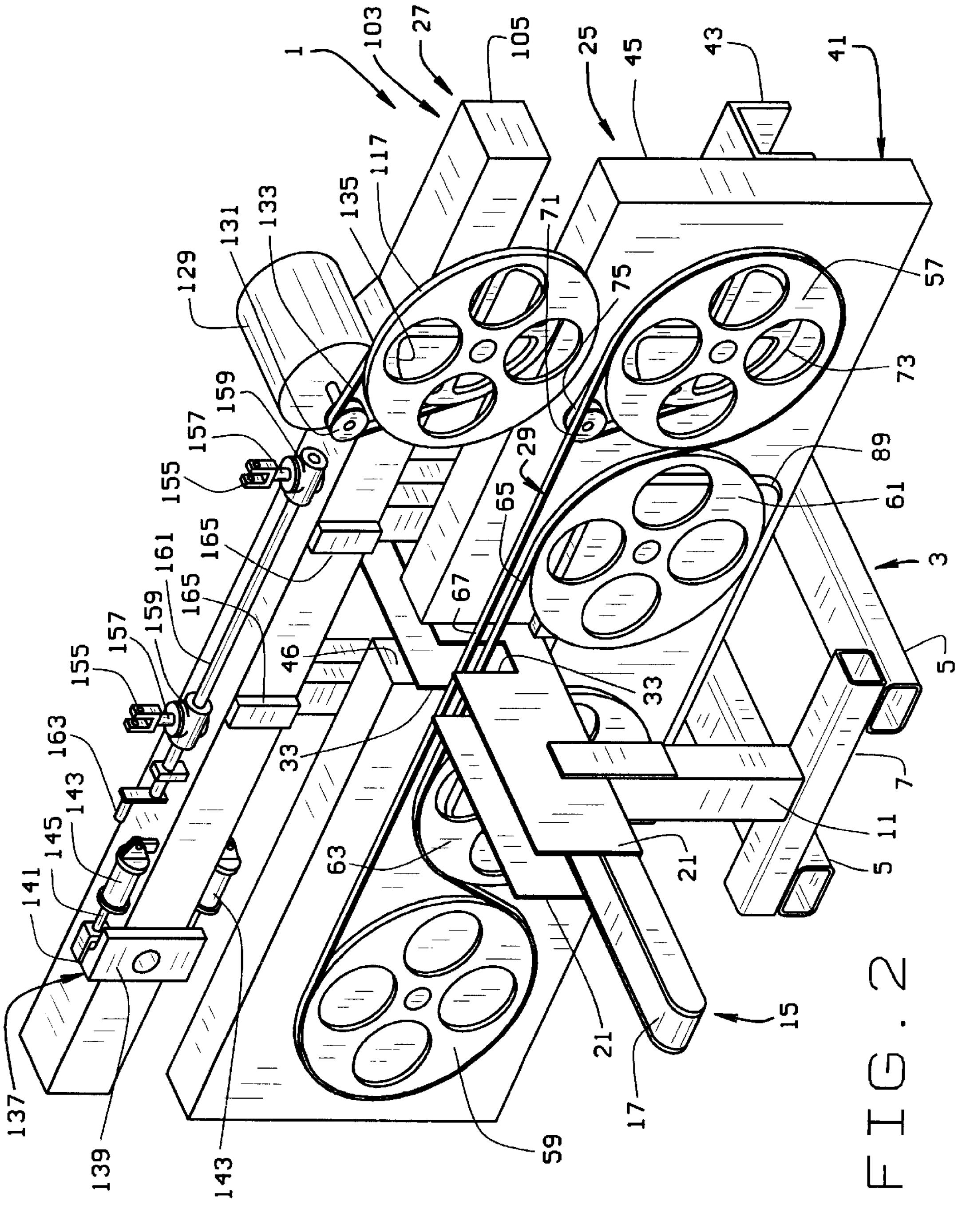
FIG. 2 is a front perspective view of the resaw, with some wheels removed for clarity.
Figure 3:
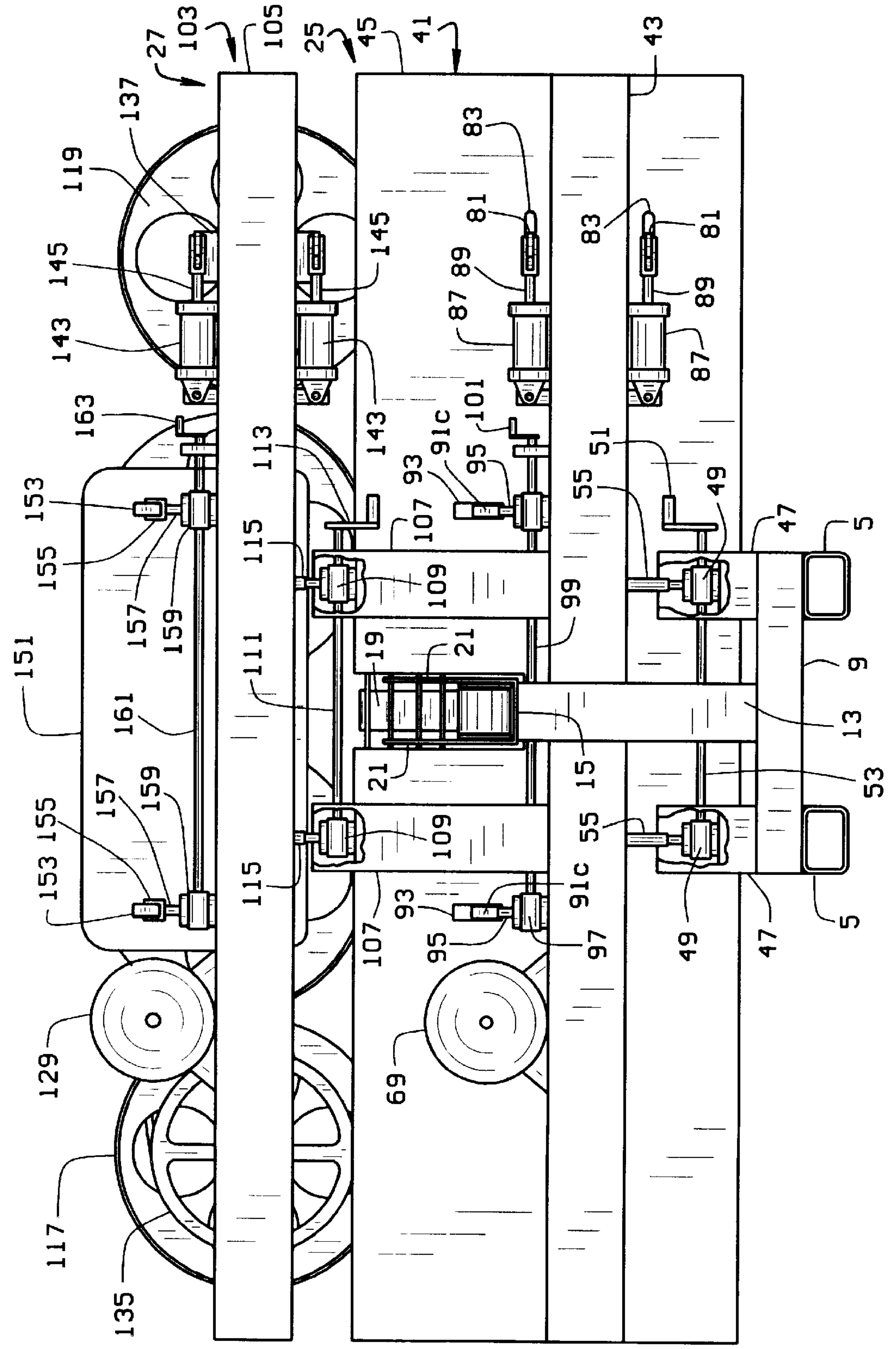
FIG. 3 is a back plan view of the resaw.

The second outer wheel 119 is slideable horizontally in the same manner as the lower head wheel 59 to facilitate mounting and dismounting of the band blade 31 as well as to enable adjustment of the position of the inner wheels relative to the outer wheels, as will be discussed below. The wheel 119 is rotatably mounted on a bracket 137 (FIG. 2). The bracket 137 includes a front face 139 to which the wheel 119 is mounted and a pair of rearwardly extending legs 141. The bracket is sized such that the legs 141 will extend above and below the mounting bar 105. Cylinders 143 (either hydraulic or pneumatic) are mounted on opposite sides of the mounting bar 105. The cylinders 143 each include a cylinder rod 145 to which the bracket legs 141 are mounted. The cylinders 143 are mounted between the bracket 139 and the conveyor 15 such that activation of the cylinders 143 will urge the wheel 119 away from the wheel 117. The cylinders 143 are connected to a pneumatic or hydraulic source (not shown) to operate the cylinders, as is known. By deactivating the cylinders, the wheel 119 can be moved towards the wheel 117 to facilitate mounting and dismounting of the band blade 31. When the band blade 31 is mounted to the head 27, the cylinders 143 can be activated to maintain the blade at a desired tension.

The inner wheels 121 and 123, as noted above are mounted to the upper head frame 103 so that they may be moved relative to the outer wheels 117 and 119. Movement of the inner wheels relative to the outer wheels alters the gap between the band blade portions 125 and 127 to alter the thickness of the boards that are cut from the cant 19. The cylinders 143 will operate, as discussed above, to automatically maintain the desired tension on the band blade. Thus, the band blade 31 does not have to be dismounted from the head 27 to alter the position of the lower wheels.

The inner wheels 121 and 123 are mounted to a plate 151 which is mounted to the upper head frame 103 to be movable relative to the outer wheels 117 and 119 in a direction perpendicular to the band blade portions 125 and 127. As shown in the drawings, the plate 151 is vertically movable. The inner wheel plate 151 has a pair of rearwardly extending arms 153. The arms 153 are connected to U-shaped brackets 155 which are mounted to the top of output shafts 157 of gear boxes 159. The gear boxes 159 are mounted to the mounting bar 105. The gear boxes 159 are interconnected by a connecting shaft 161 and are operated by a crank 163 which is connected to the input of one of the gear boxes 159. Thus, when the crank 163 is rotated, the output rods 157 will be raised (or lowered) in unison. Although the inner wheels 121 and 123 are shown mounted to the plate 151, they could be directly mounted to individual brackets. Because the gear boxes 159 are interconnected, the inner wheels 121 and 123 are be moved in unison and to the same amount. As can be appreciated, the arms 153 hold the plate 151 slightly forward of the mounting bar 105. To maintain the plate 151 in a vertical orientation, spacers 165 are provided on the mounting bar 105. The plate 151 will then slide past the spacers 165 when it is moved. During operation of the resaw, the spacers 165 will prevent the plate 151 from pivoting relative to the mounting bar 105 to maintain the band blade portions 125 and 127 in a single vertical plane. As can be appreciated, the lower head 25 can similarly be provided with spacers to hold the plate 89 in a single vertical plane. The upper and lower heads 25 and 27, and thus the upper and lower band blades 29 and 31, are preferably in the same vertical plane.

The resaw 1 can be operated so that only the lower head 25 is used or so that both the lower and the upper heads 25 and 27 are used. When only the lower head is used, the resaw will make two slices simultaneously through the cant 19 to cut two or more boards using a single head. The ability to adjust the position of the head 25 relative to the conveyor belt 17 and the relative position of the inner wheels 61 and 63 relative to the outer wheels 57 and 59 enables operator to cut the boards to a desired thickness. The distance from the conveyor belt to the lower blade portion 65 of the band blade 29 is set using the crank 51, and the distance between the two blade portions 65 and 67 is set using the crank 101. If desired, the head 25 can be adjusted so that the boards will be of the same thickness, or they can be of different thickness.

When both the upper and lower heads are used, the two beads will make four slices in the cant to cut up to four boards at once from the cant. The adjustability of the upper head 27 allows for the selection of a desired thickness of the boards cut from the cant. By operating the crank 113, the position of the lower portion 127 of the band blade 31 can be set relative to the upper portion 69 of the band blade 29. By operating the crank 163, the position of the upper portion 125 of the band blade 31 can be adjusted relative to the lower portion 127. Thus, again, all the boards which are cut from the cant can be cut to be of an equal thickness, or the thickness of the various boards cut from the cant can be varied if desired.

As can be appreciated, the ability to cut two or four boards simultaneously from a single cant reduces or even eliminates the need for turn-around equipment to deliver the cant back to the entrance of the saw. Further, it also reduces the possibility of miscuts due to warping of the boards as the stress of the boards is released during the cutting process.

Figure 5:
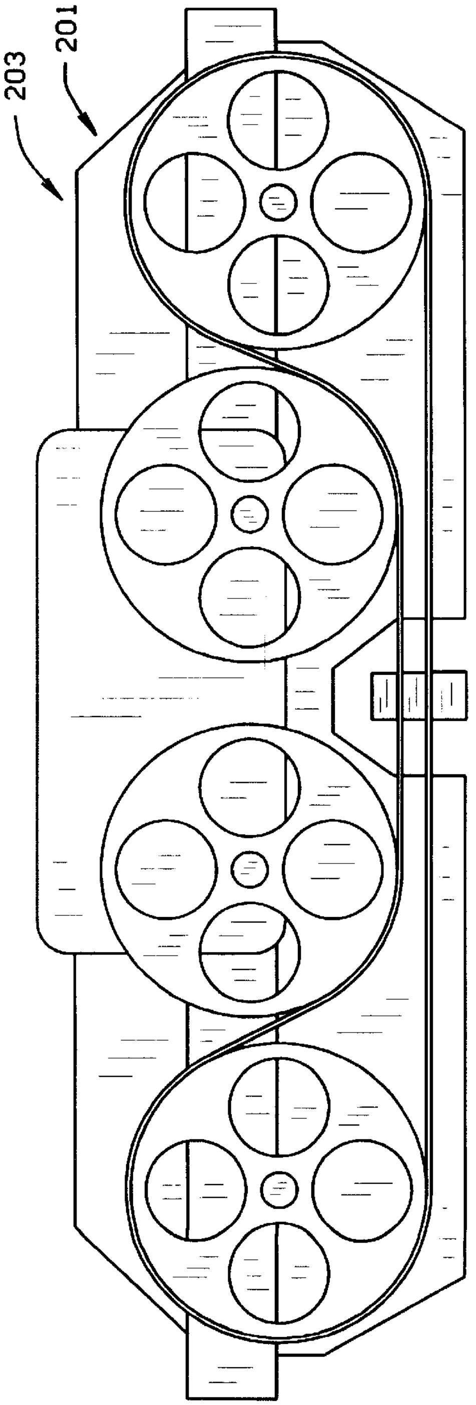
FIG. 5 is a front plan view of a second embodiment of the resaw wherein the resaw has four wheels instead of eight, and is adapted to cut a cant into at least two boards.

A single head resaw 201 is shown in FIG. 5, without its accompanying frame. The head 203 of the resaw 201 is substantially identical to the lower head 25 of the resaw 1. Basically, the resaw 201 is identical to the resaw 1, except that it includes only one head, rather than two aligned heads which are positioned in the same vertical plane, as are the heads 25 and 27 of the resaw 1 of FIG. 1. Although the head 203 is shown as an upper head, it could also be configured to be a lower head.

Figure 6:
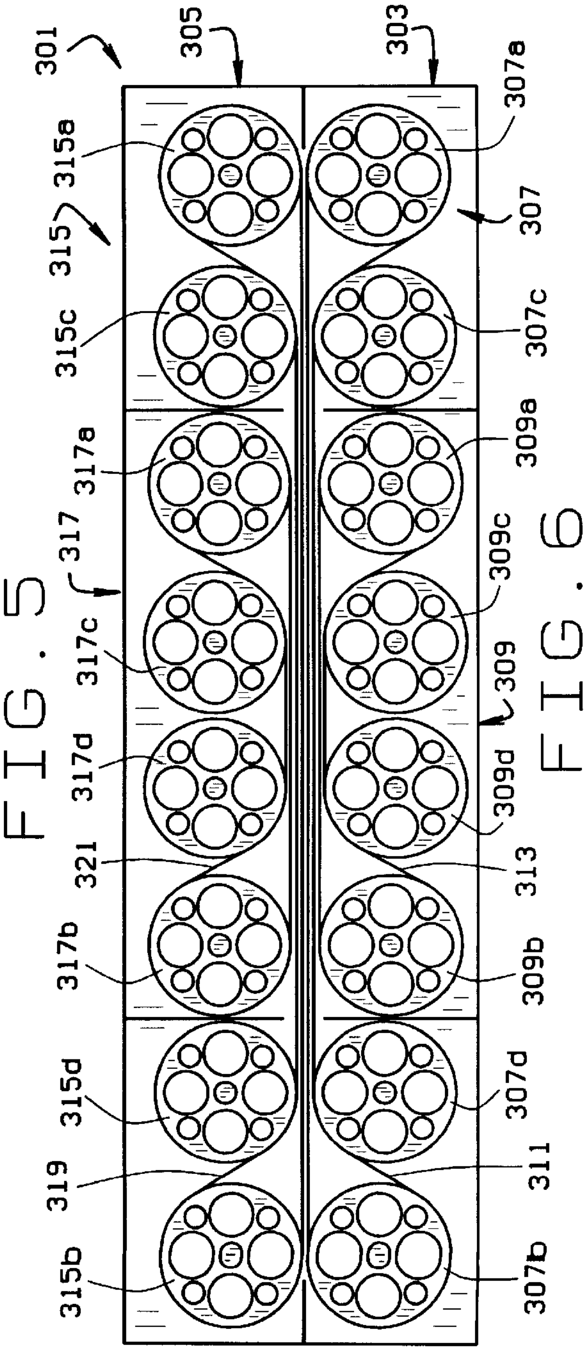
FIG. 6 is a front plan view of a third embodiment of the resaw, wherein the resaw has sixteen wheels and four band blades, and is adapted to cut a cant into at least eight boards.

A two head resaw 301 is shown generally schematically in FIG. 6. The resaw 301 has a lower head 303 and an upper head 305. The lower head and upper head include a total of sixteen wheels to allow for the operation of up to four separate band blades. This allows for eight slices to be simultaneously made in a cant to cut up to eight or more boards at once from the cant. The lower head includes an outer set 307 of wheels and an inner set 309 of wheels. The outer set of wheels includes a pair of outer wheels 307*a,b* and a pair of inner wheels 307*c,d.* A first band blade 311 is mounted about the wheels 307*a–d* in the same manner the band blade 29 is mounted on the wheels of the lower head 25 of the resaw 1. The inner set of wheels 309 includes an outer pair of wheels 309*a,b* and an inner pair of wheels 309*c,d.* A second band blade 313 is mounted on the wheels 309*a–d* in the same manner as the band blade 311 is mounted on wheels 307*a–d.* The inner and outer sets of wheels 309 and 307 are independently mounted to the frame of the resaw 301 such that relative position of the inner set 309 of wheels and the outer set 307 of wheels may be adjusted. Within the inner and outer sets of wheels, the inner pairs of wheels 307*c,d* and 309*c,d* may be moved relative to the outer pairs of wheels 307*a,b* and 309*a,b,* in the same manner as set forth above with respect to the resaw 1.

As with the resaw 1, the upper head 305 of the resaw 301 is substantially identical to the lower head 303. It includes an outer set 315 of wheels and an inner set 317 of wheels. The outer set 315 of wheels includes a pair of outer wheels 315*a,b* and a pair of inner wheels 315*c,d.* A third band blade 319 is mounted about the wheels 315*a–d* in the same manner the band blade 31 is mounted on the wheels of the upper head 27 of the resaw 1. The inner set of wheels 317 includes an outer pair of wheels 317*a,b* and an inner pair of wheels 317*c,d.* A fourth band blade 321 is mounted on the wheels 317*a–d* in the same manner as the band blade 319 is mounted on wheels 315*a–d.* The inner and outer sets of wheels 317 and 315 are independently mounted to the frame of the resaw 301 such that relative position of the inner set 317 of wheels and the outer set 315 of wheels may be adjusted. Within the inner and outer sets of wheels, the inner pairs of wheels 315*c,d* and 317*c,d* may be moved relative to the outer pairs of wheels 315*a,b* and 317*a,b,* in the same manner as set forth above with respect to the resaw 1.

Although the mechanism used for adjusting the relative positions of the inner and outer sets of wheels of the upper and lower heads of the resaw 301 are not shown, it will be understood that the mechanism will be substantially the same as that used to adjust the position of inner and outer wheels of the resaw 1 of FIGS. 14. Further, as can be seen, the resaw 301 uses two different sizes of band blades. The band blades 311 and 319, which extend around the outer sets 307 and 315 of wheels are of one size, and the band blades 313 and 321, which extend around the inner sets 309 and 317 of wheels, are of a second and smaller size. As with the resaw 1, each set of wheels will have a motor to drive the band blade, and one of outer wheels of each set (i.e., wheels 307*b*, 309*b*, 315*b*, and 317*b*) will be horizontally adjustable to facilitate mounting and removal of the band blades as well as changing the position of the inner wheels relative to the outer wheels.

Preferably, the resaw 301 will be made using smaller wheels than the wheels of the resaw 1. For example, where the wheels of the resaw 1 are about 36" in diameter, the wheels of the resaw 301 are about 28" in diameter. This allows for the resaw 301 to not be much wider than the resaw 1. Whereas the resaw 1 is about 17' in width, the resaw 301 is about 21' in width.

In view of the above, it will be seen that the several objects and advantages of the present invention have been achieved and other advantageous results have been obtained. As various changes could be made in the above constructions without departing from the scope of the invention, it is intended that all matter contained in the above description or shown in the accompanying drawings shall be interpreted as illustrative and not in a limiting sense. For example, although the resaw is shown to be generally horizontal, the resaw could be made to be vertical. This, of course, would make mounting and removal of the band blades more difficult. Although cranks are used to adjust the position of the head frames relative to the conveyor and of the inner wheels relative to the outer wheels, the relative positions of the wheels can be adjusted using other conventional means, such as hydraulic or pneumatic cylinders. Further, whether gears or cylinders are used to adjust the relative positions of the pairs of wheels and the heads of the resaw, the adjustment may be automated. That is, instead of manually setting the position of the wheels (and hence the blade portions), it may be automatically controlled, for example, by a computer. Alternatively, a scissors or bellows type arrangement can be used to alter the position of the inner wheels relative to the outer wheels and the upper head relative to the lower head. Although an individual motor is provided for each separate band blade, a single motor can be used to drive both band blades of the resaw 1 or all four band blades of the resaw 301. Alternatively, with respect to the resaw 301, a single motor could be used to drive bot band blades of the upper head 305 and a second motor could be used to drive both band blades of the lower head 303. These variations can be accomplished through a pulley or chain system, or by a gear system. These examples are merely illustrative.

What is claimed is:

1. A resaw for substantially simultaneously making four or more slices in a cant to cut four or more boards from the cant in a single pass through the resaw; the resaw having a frame, two heads mounted to said frame, and an inlet and outlet defining a path of travel of the cant through the resaw; each said head including;

a mounting beam extending perpendicularly to said path of travel; said mounting beam being mounted to said frame to be movable perpendicularly to the path of travel;

a first outer wheel, a second outer wheel, a first inner wheel and a second inner wheel operatively mounted to said mounting beam; the inner wheels having centers offset from centers of the outer wheels along a plane perpendicular to the path of travel, and a centerline extends through the centers of the inner wheels; said inner wheels being movable relative to said outer wheels to adjust the relative positions thereof; and a band blade comprising a first blade portion and a second blade portion; said blade portions being substantially parallel to each other in a plane perpendicular to the path of travel of the cant; the band blade being threaded about the wheels such that the first blade portion moves in a first direction and the second blade portion moves in a second opposite direction, and such that said blade portions are disposed on the same side of said centerline; said first and second blade portions being driven generally perpendicularly across said path of travel of the cant; whereby the movement of said inner wheels relative to said outer wheels alters the distance between said blade first portion and said blade second portion;

said heads being mounted to said frame such that the first blade portions of the band blade of each head are proximate each other; at least one of said heads being movable relative to the other of said heads to selectively adjust the distance between the band blades; whereby the distance between the cuts made by the band blade first portions can be selectively altered.

2. The resaw of claim 1 including at least one output shaft extending downwardly from one of said mounting beams; said output shaft being mounted to the frame to be movable relative to the frame, whereby movement of the output shaft will move at least the one mounting beam, and hence at least the inner and outer wheels mounted to that mounting beam, relative to the path of travel.

3. The resaw of claim 2 including at least one gear box mounted to said frame and a crank; said at least one gear box drivingly receiving said output shaft; said crank being operatively connected to said gear box, whereby when said crank is turned, said output shaft moves relative to said frame to move at least said one mounting beam.

4. The resaw of claim 1 wherein said second outer wheel is movable in a path parallel to the first and second blade portions.

5. The resaw of claim 4 including a mounting bracket mounted to said mounting beam to be movable parallel to said beam; said second outer wheel being rotatably mounted to said mounting bracket.

6. The resaw of claim 5 including first and second pistons mounted on opposite sides of said mounting beam; said mounting bracket having a front plate and spaced apart legs; said second outer wheel being mounted to said bracket front plate, said spaced apart legs extending over opposite sides of said mounting bar, and said bracket legs being connected to said pistons.

7. The resaw of claim 1 including an adjustment mechanism operatively connected to at least one pair of the inner wheels and the pair of outer wheels to selectively adjust the position of the inner and outer wheels relative to each other to alter the distance between said first and second blade portions.

8. The resaw of claim 7 wherein said adjustment mechanism includes a shaft mounted to said mounting beam to be movable perpendicularly to said mounting beam; and an inner wheel bracket mounted to said shaft; said inner wheels being operatively mounted to said inner wheel bracket; whereby movement of said shaft will move said inner wheels relative to said outer wheels.

9. The resaw of claim 8 including an inner wheel mounting plate; said inner wheels being rotatably mounted to said inner wheel mounting plate, and said inner wheel mounting plate being connected to said inner wheel bracket.

10. The resaw of claim 8 wherein said adjustment mechanism further includes at least an inner wheel gear box, an inner wheel crank operatively connected to said inner wheel gear box, said shaft being an output shaft of said inner gear box; whereby operation of said inner wheel crank will move said output shaft to adjust the position of said inner wheels relative to said outer wheels.

11. The resaw of claim 8 wherein the inner wheel gear box is a first inner wheel gear box, and the adjustment mechanism further includes a second inner wheel gear box having a second output shaft; said first and second inner wheel gear boxes being operatively interconnected by a connecting shaft, whereby operation of said crank will operate both of said inner wheel gearboxes simultaneously.

12. A resaw for substantially simultaneously making four slices in a cant to cut four boards from the cant in a single pass through the resaw; the resaw having frame; a first head and a second head mounted to the frame;

each said head including:

an inner pair of wheels and an outer pair of wheels, wherein each wheel rotates about a rotational axis, and a centerline extends through the rotational axes of said inner wheels;

a band blade threaded about the wheels, the band blade defining a first blade portion and a second blade portion; said blade portions being substantially parallel to each other and disposed on the same side of said centerline; said heads being mounted to said frame such that the band blades of the heads are proximate each other;

a first adjusting mechanism operatively connected to at least one pair of said pairs of wheels to selectively adjust the position of said one pair of wheels relative to the other pair of wheels, such that the space between the blade portions can be selectively altered; and a tensioning mechanism operatively connected to at least one of said wheels for automatically maintaining a desired tension on said band blade as the position of said one pair of wheels relative to said other pair of wheels is adjusted; and a second adjusting mechanism operatively connected to at least one of said heads for adjusting the position of said first and second heads relative to each other thus adjusting the distance between the band blades; whereby, by selectively adjusting the first adjusting mechanism of each head and the second adjusting mechanism, boards of a desired width can be cut from said cant.

* * * * *